US006830816B2

(12) United States Patent
Mehnert et al.

(10) Patent No.: US 6,830,816 B2
(45) Date of Patent: Dec. 14, 2004

(54) HIGHLY FILLED, PASTY, COMPOSITION CONTAINING SILICOORGANIC NANOHYBRID AND/OR MICROHYBRID CAPSULES FOR SCRATCH-RESISTANT AND/OR ABRASION-RESISTANT COATINGS

(75) Inventors: Reiner Mehnert, Markkleeberg (DE); Hans-Juergen Glaesel, Leipzig (DE); Helmut Langguth, Leipzig (DE); Jaroslaw Monkiewicz, Rheinfelden (DE); Roland Edelmann, Wehr (DE); Bjoern Borup, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 43 days.

(21) Appl. No.: 10/112,042

(22) Filed: Apr. 1, 2002

(65) Prior Publication Data

US 2003/0008974 A1 Jan. 9, 2003

(30) Foreign Application Priority Data

| Mar. 30, 2001 | (DE) | 101 16 207 |
| Aug. 25, 2001 | (DE) | 101 41 688 |
| Feb. 21, 2002 | (DE) | 102 07 401 |

(51) Int. Cl.$^7$ .......................... C08K 3/20; B32B 27/32; B32B 27/36; B32B 27/740
(52) U.S. Cl. .................... 428/423.1; 523/206; 523/209; 523/400; 523/205; 524/430; 524/493; 524/497; 524/556; 524/588; 524/589; 524/837; 524/858; 428/405; 428/447; 428/480; 428/522
(58) Field of Search .................. 428/405; 524/430, 524/556, 588, 589, 500, 493, 497, 837, 858, 492, 599; 523/205, 206, 209, 400

(56) References Cited

U.S. PATENT DOCUMENTS

| 4,624,971 | A | | 11/1986 | Van Tao et al. |
| 5,808,125 | A | | 9/1998 | Standke et al. |
| 5,849,942 | A | | 12/1998 | Standke et al. |
| 5,863,509 | A | | 1/1999 | Standke et al. |
| 5,885,341 | A | | 3/1999 | Standke et al. |
| 5,932,757 | A | | 8/1999 | Standke et al. |
| 6,054,601 | A | | 4/2000 | Standke et al. |
| 6,063,830 | A | * | 5/2000 | Deguchi et al. ............ 523/115 |
| 6,100,418 | A | | 8/2000 | Standke et al. |
| 6,133,466 | A | | 10/2000 | Edelmann et al. |
| 6,177,584 | B1 | | 1/2001 | Loewenberg et al. |
| 6,228,499 | B1 | * | 5/2001 | Nakauchi et al. ........... 428/412 |
| 6,228,936 | B1 | | 5/2001 | Standke et al. |
| 6,239,194 | B1 | | 5/2001 | Standke et al. |
| 6,251,989 | B1 | | 6/2001 | Edelmann et al. |
| 6,255,513 | B1 | | 7/2001 | Standke et al. |
| 6,288,256 | B1 | | 9/2001 | Standke et al. |
| 6,312,861 | B1 | * | 11/2001 | Ciccarelli et al. ........ 430/108.3 |
| 6,361,871 | B1 | | 3/2002 | Jenkner et al. |
| 6,395,858 | B1 | | 5/2002 | Mack et al. |
| 6,403,228 | B1 | | 6/2002 | Mack et al. |
| 6,500,883 | B1 | | 12/2002 | Mack et al. |
| 6,528,585 | B1 | | 3/2003 | Standke et al. |
| 6,534,667 | B1 | | 3/2003 | Standke et al. |
| 6,586,483 | B2 | * | 7/2003 | Kolb et al. ................. 521/91 |
| 6,593,392 | B2 | * | 7/2003 | Wang ......................... 522/83 |

FOREIGN PATENT DOCUMENTS

| DE | 197 19 948 A1 | 11/1998 |
| DE | 198 46 659 A1 | 4/2000 |
| DE | 198 46 660 A1 | 4/2000 |
| DE | 199 55 047 A1 | 6/2001 |
| DE | 199 61 972 A1 | 6/2001 |
| DE | 100 56 343 A1 | 5/2002 |
| DE | 101 00 631 A1 | 6/2002 |
| DE | 101 00 633 A1 | 6/2002 |
| EP | 0 075 697 A1 | 4/1983 |
| EP | 0 518 057 A1 | 12/1992 |
| EP | 0 590 270 A2 | 4/1994 |
| EP | 0 716 127 A2 | 6/1996 |
| EP | 0 716 128 A2 | 6/1996 |
| EP | 0 760 372 A2 | 3/1997 |
| EP | 0 814 110 A1 | 12/1997 |
| EP | 0 832 911 A1 | 4/1998 |
| EP | 0 846 715 A2 | 6/1998 |
| EP | 0 846 716 A2 | 6/1998 |
| EP | 0 846 717 A2 | 6/1998 |
| EP | 0 850 106 B1 | 7/1998 |
| EP | 0 930 342 A2 | 7/1999 |
| EP | 0 953 591 A1 | 11/1999 |
| EP | 0 955 344 A2 | 11/1999 |
| EP | 0 960 921 A2 | 12/1999 |
| EP | 0 978 525 A2 | 2/2000 |
| EP | 0 997 469 A2 | 5/2000 |
| EP | 1 031 593 A2 | 8/2000 |
| WO | WO 01/64796 A1 | 9/2001 |

OTHER PUBLICATIONS

Dr. Mo Misra, Dr. Allen Guest, Dr. Mark Tilley; Radcure Application & Performance, "Hybrid Inorganic–Organic UV–Curable Abrasion Resistant Coatings", Paper 3, pp. 1–7.

* cited by examiner

Primary Examiner—Margaret G. Moore
Assistant Examiner—Marc Zimmer
(74) Attorney, Agent, or Firm—Oblon, Spivak, McClelland, Maier & Neustadt, P.C.

(57) ABSTRACT

The present invention relates to a composition containing silico-organic nanohybrid and/or microhybrid capsules for scratch-resistant and/or abrasion-resistant coatings, wherein the silico-organic nanohybrid and/or microhybrid system includes one or more small metal oxide cores A and a substantially complete, silico-organic shell B, and the composition can be obtained by a reaction performed in situ, in a synthetic resin or in a synthetic-resin precursor compound, between metal oxide particles (KA-O) and at least one organofunctional silicon compound which contains an organofunctional group and at least one hydrolyzable group or at least one hydroxy group. The present invention also relates to the use of such compositions as the base for lacquers for producing a scratch-resistant and abrasion-resistant coating on a substrate as well as articles provided with corresponding scratch-resistant as well as abrasion-resistant coatings.

27 Claims, No Drawings

HIGHLY FILLED, PASTY, COMPOSITION CONTAINING SILICOORGANIC NANOHYBRID AND/OR MICROHYBRID CAPSULES FOR SCRATCH-RESISTANT AND/OR ABRASION-RESISTANT COATINGS

BACKGROUND OF THE INVENTION

1. Field of the Invention

The present invention relates to a composition containing silico-organic nanohybrid and/or microhybrid capsules for scratch-resistant and/or abrasion-resistant coatings, wherein the silico-organic nanohybrid and/or microhybrid system includes one or more small metal oxide cores A and a substantially complete, silico-organic shell B, and the composition can be obtained by a reaction performed in situ, in a synthetic resin or in a synthetic-resin precursor compound, between metal oxide particles (KA-O) and at least one organofunctional silicon compound which contains an organofunctional group and at least one hydrolyzable group or at least one hydroxy group. The present invention also relates to the use of such compositions as the base for lacquers for producing a scratch-resistant and abrasion-resistant coating on a substrate as well as articles provided with corresponding scratch-resistant as well as abrasion-resistant coatings.

2. Discussion of the Background

The surface characteristics of sol or gel particles or of metal or semimetal oxides can be modified by treatment with a hydrolyzable organosilane or organosiloxane, wherein a single-layer silane coating is usually bound to the oxide or solgel particles. Oxides or sol or gel particles treated in this way, such as inorganic pigments or fillers, can be incorporated in a polymer matrix—in sheetings as well as in coating agents and coatings that can be produced therewith. Usually, however, the scratch resistance and abrasion resistance of such polymer systems is poor.

German Patent 19846660 discloses nanoscale, surface-modified oxide and mixed oxide particles enveloped by silico-organic groups bonded covalently to the oxide particle, wherein the organofunctional groups are described as reactive groups and are usually oriented outward, so that, during curing of the prepolymer, they become incorporated in the polymer matrix by polymerization with the polymeric material. The method for preparation of such coating agents is complex, since the organosilane and the oxide components are incorporated in alternating sequence in the prepolymer.

German Patent 19846659 has the same priority date as German Patent 19846660 and relates to a layered material, which is provided with a scratch-resistant synthetic-resin layer that also contains nanoscale, surface-modified oxide particles. German Patent 19846659 discloses the use of acryloxyalkylsilanes for production of a shell of nanoscale oxide particles containing reactive groups capable of radiation cross-linking. Here also the preparation of the coating agent takes place by a time consuming reaction of a nanoscale silica with 3-methacryloxypropyltrimethoxysilane (DYNASYLAN® MEMO) in an acrylate formulation in the presence of water, an acid and a surfactant. The components must be brought together in a special alternating sequence.

Hydrolyzable silane components having ethylenically unsaturated organic groups are expensive starting materials. In addition, DYNASYLAN® MEMO tends to react in the presence of minor traces of substances capable of initiating polymerization or in the presence of radiation, whereby the viscosity of a corresponding formulation can increase drastically. Stabilizers must be added to prevent the undesired polymerization. Thus it is often difficult to control the manipulation of the starting materials and the preparation of such coating systems.

In addition, the above-mentioned coating agents are frequently highly viscous and usually contain only a low proportion of oxide particles, with consequences for the scratch resistance of the subsequent coating. It is also difficult to apply such highly viscous coating agents onto a substrate, and this is particularly so in the case of thin substrates that are susceptible to tearing. The scratch resistance of coatings obtained in this way is often in need of improvement. Moreover, a special complex applicator is necessary for such highly viscous systems. Frequently, solvents are also added to such highly viscous coating agents, thus leading to increased organic emissions (the so-called, "VOC problem", where VOC=volatile organic compounds).

In a Taber Abraser test performed per DIN 68861 (incorporated herein by reference) on a commercial abrasion-resistant PU lacquer, 2 mg of abraded material was measured after 50 revolutions.

According to German Patent Applications 10100631 and 10100633, which have not yet been published, substantially scratch-resistant (DIN 53799, incorporated herein by reference) coatings can be produced. Unfortunately, such coating systems cannot be used for applications in which not only scratch resistance but also adequate abrasion resistance is necessary (haze according to DIN 52347/ASTM D-1044 {incorporated herein by reference} and abrasion according to DIN 68861, already incorporated herein by reference), for example for wood lacquers and for plastic and parquet floors. In addition, highly filled systems may exhibit in homogeneities, with disadvantages for the surface quality of the subsequent coating. At this place it is also appropriate to mention German Patent Application 10141690, which is entitled "Composition containing silico-organic nanohybrid/microhybrid systems for scratch-resistant and abrasion-resistant coatings".

SUMMARY OF THE INVENTION

One object of the present invention is to avoid the problems of the conventional compositions.

Another object of the present invention is to provide a composition suitable for use in lacquer formulations, scratch-resistant or abrasion-resistant finishes, which is homogeneous and which can be used in a wide variety of applications.

These and other objects have been achieved by the present invention, the first embodiment of which is a filled composition, which includes:

at least one silico-organic nanohybrid or microhybrid capsule; and at least one synthetic resin or synthetic-resin precursor compound;

wherein the silico-organic nanohybrid or microhybrid capsule includes an oxide core A and a silico-organic shell B;

wherein the oxide core A includes at least one nanoscale or microscale particle (KA-O) of component (a), (b), or a mixture thereof, wherein the (KA-O) component (a) includes at least one nanoscale oxide or mixed oxide of at least one metal or semimetal selected from the group including main groups 2 to 6 of the Periodic Table, transition groups 1 to 8 of the Periodic Table, lanthanides, and mixtures thereof;

wherein the (KA-O) component (b) includes at least one microscale corundum;

wherein the silico-organic shell B includes:

at least one silico-organic compound having the formula Ia:

(Si'O—)$_x$Si—R  (Ia)

wherein R denotes an organofunctional group selected from the group including straight-chain, branched or cyclic alkyl group with 1 to 50 C atoms, alkenyl group with 2 to 6 C atoms, chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl and ureidoalkyl;

wherein x is a number from 0 to 20, wherein remaining free valences of Si are each independently (KA-O)—, SiO— or -Z, wherein remaining free valences of Si' are each independently (KA-O)—, SiO—, —R, or -Z, wherein the Z groups are the same or different and denote hydroxy or alkoxy group, and wherein each Si or Si' in the shell B have not more than one —R attached thereto;

which is obtained by reaction of:

(i) one or more oxide particles selected from the group including:
   (a) at least one nanoscale oxide and/or mixed oxide of at least one metal or semimetal of the second to sixth main group or of the first to eighth subgroup of the periodic table or of the lanthanides or
   (b) a microscale corundum; and
   (c) a mixture of oxide particles of (a) and (b);

with (ii) at least one organofunctional silane having the formula II:

$R^1_sR^2_rSiY_{(4-s-r)}$  (II), wherein the groups $R^1$ and $R^2$ are the same or different and each represents a straight-chain, branched or cyclic alkyl group with 1 to 50 C atoms, an alkenyl group with 2 to 6 C atoms, a chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, Y represents a methoxy, ethoxy, i-propoxy, n-propoxy or 2-methoxyethoxy group, wherein s is equal to 1 or 2 or 3, wherein r is equal to 0 or 1 or 2, with the proviso that (s+r)≦3;

(iii) optionally a monomeric and/or oligomeric silicic acid ester, which is substituted with one or more methoxy, ethoxy, n-propoxy or i-propoxy groups and which has an average degree of oligomerization of 1 to 50; and (iv) optionally an organofunctional siloxane having one or more functionalities which are the same or different and each Si atom in the siloxane is substituted with one or more functionality selected from the group including alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloxyalkyl, methacryloxyalkyl, mercaptoalkyl, ureidoalkyl, aryl and alkoxy, and remaining free valences of each Si atom in the siloxane are independently saturated by one or more methoxy or ethoxy or hydroxy groups;

wherein the reaction is performed in situ in a liquid, curable synthetic resin or a precursor stage of a synthetic resin in which the content of oxide particles of component (i) is 10 to 300 parts by weight relative to 100 parts by weight of the synthetic resin component used, and the reaction is performed in a kneading or dispersing machine.

Another embodiment of the invention provides a method for preparing the above composition, which includes:

reacting:

(i) oxide particles from the series selected from the group including:
   (a) at least one nanoscale oxide and/or mixed oxide particle of at least one metal or semimetal of the second to sixth main group or of the first to eighth subgroup of the periodic table or of the lanthanides or
   (b) a microscale corundum particle or
   (c) a mixture of oxide particles of (a) and (b), with (ii) at least one organofunctional silane having the formula II

$R^1_sR^2_rSiY_{(4-s-r)}$  (II), wherein the groups $R^1$ and $R^2$ are the same or different and each independently represents a straight-chain, branched or cyclic alkyl group with 1 to 50 C atoms, an alkenyl group with 2 to 6 C atoms, a chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl and ureidoalkyl group, wherein Y represents a methoxy, ethoxy, i-propoxy, n-propoxy or 2-methoxyethoxy group, wherein s is equal to 1 or 2 or 3 and r is equal to 0 or 1 or 2, with the proviso that (s+r)≦3, and (iii) optionally a monomeric and/or oligomeric silicic acid ester, which is substituted with one or more methoxy, ethoxy, n-propoxy or i-propoxy groups and which has an average degree of oligomerization of 1 to 50;

and (iv) optionally an organofunctional siloxane having one or more functionalities which are the same or different and each Si atom in the siloxane is substituted with one or more functionality selected from the group including alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloxyalkyl, methacryloxyalkyl, mercaptoalkyl, ureidoalkyl, aryl and alkoxy, and remaining free valences of each Si atom in the siloxane are independently saturated by one or more methoxy or ethoxy or hydroxy groups;

wherein the reaction is performed in situ in a liquid, curable synthetic resin or a precursor stage of a synthetic resin in which the content of oxide particles of component (i) is 10 to 300 parts by weight relative to 100 parts by weight of the synthetic resin component used, and the reaction is performed in a kneading or dispersing machine.

Another embodiment of the invention provides a lacquer or scratch-resistant coating, which includes the above composition.

Another embodiment of the invention provides a method for making a lacquer or scratch-resistant coating, which includes contacting the above composition with a solvent.

Another embodiment of the invention provides a method for making a lacquer or scratch-resistant coating, which includes diluting the above composition with at least one selected from the group including a liquid synthetic resin, a precursor compound of a synthetic resin, a solvent, and mixtures thereof.

Another embodiment of the invention provides a method for making a coating, which includes contacting the above composition with a substrate.

DESCRIPTION OF THE PREFERRED EMBODIMENTS

Various other objects, features and attendant advantages of the present invention will be more fully appreciated as the same becomes better understood from the following detailed description of the preferred embodiments of the invention.

It has been found that, by performing the in situ reaction as can be inferred in particular from German Patents 10100631, 10100633 and 10141690 on a three-cylinder mill, in a cone mixer, in a kneader or in a disperser with good dispersing effect—an example of which is offered under the name Torusmill® by VMA-Getzmann GmbH (European Patent 0850106 B1), although if the Torusmill® is employed for the present invention, exclusively the dissolver or the dissolver disk is employed and exploited, meaning that the immersion grinder of the Torusmill® is not activated for this purpose and the immersion-grinder function is not used for the present preparation method—it is possible, by incorporating at least one silico-organic compound and microscale corundum and/or nanoscale oxide into a synthetic resin or into a synthetic-resin precursor compound, to obtain pastes that are stable during storage and are largely resistant to aging, or in other words are highly filled compositions of excellent homogeneity containing silico-organic nanohybrid and/or microhybrid capsules. The entire contents of each of the aformentioned patents is hereby incorporated by reference.

By diluting such a concentrate or such a paste with a prepolymer, such as an acrylate, preferably 1 part by weight of paste with 1 to 5 parts by weight, particularly preferably 1 to 3 parts by weight, especially 1.5 parts by weight of acrylate, it is possible to obtain lacquer systems that yield excellent scratch-resistant and abrasion-resistant coatings after radiation curing. These ranges include all values and subranges therebetween, including 1.1, 1.3, 1.7, 1.9, 2, 2.5, 2.7, 3.1, 3.5, 3.7, 4, 4.1, 4.3, 4.5, and 4.7 parts by weight of acrylate.

The present pastes can also be incorporated in simple manner in existing lacquer systems based on synthetic resins and used advantageously to produce scratch-resistant and abrasion-resistant coatings.

The present pastes can preferably be mixed in particularly simple and economic manner with, for example, acrylate diluents, such as DPGDA or HDDA, and more preferably with further known lacquer additives, and diluted in the desired manner to a ready-to-use scratch-resistant and/or abrasion-resistant lacquer capable of being cross-linked by peroxides or radiation.

For this purpose it is preferable to place the diluent or a lacquer into a container beforehand and then to stir in the inventive paste simply and economically. The present pastes are therefore characterized by a surprisingly advantageous processability both in production of the pastes and in application after dilution.

In addition, with the present invention, disproportionate wear of the mixing and application equipment does not occur even at high corundum content in the composition. This can be attributed to the silico-organic shell around the oxide particles.

Preferably, after dilution with a suitable diluent or by incorporation in organic lacquer systems by the user, inventive pastes can be used advantageously to produce particularly scratch-resistant and abrasion-resistant coatings on substrates as well as corresponding articles therefrom.

Preferred examples of a curable synthetic resin or of a precursor stage of a curable synthetic resin, or a liquid prepolymer or a mixture of corresponding prepolymers, include acrylates, methacrylates, epoxide, polyurethane, unsaturated polyesters or mixtures thereof.

Furthermore, the present procedure yields oxide particles that are enveloped substantially completely by a plurality of silico-organic layers, or in other words cores A, which are preferably advantageously obtained directly in finely dispersed form in a curable synthetic resin or in a precursor stage of a curable synthetic resin.

Preferably, the present procedure yields the silico-organic nanohybrid or microhybrid system in a form that is incorporated particularly homogeneously in the prepolymer.

Compositions obtained in this way are characterized by a surprisingly advantageous processability in preparation and application, since despite a corundum content in the composition, the silico-organic shell around the corundum particles prevents additional wear of the mixing and application equipment.

Any dilatancy of lacquers can represent a problem in industrial processes in general, and during coating with special lacquers in particular. Typical target viscosities for such dilatant coating systems range up to 2500 mPa s. Inventive solvent-free coating agents, however, preferably have a viscosity of >500 to 2000 mPa s, particularly preferably of 800 to 1000 mPa s. For application by rolls, the viscosity should be in the range of 0.8 to 1.2 Pa s. These ranges include all values and subranges therebetween, including 600, 700, 900, 1000, 1200, 1400, 1600 and 1800 mPa s; and 0.9, 1.0, 1.1, and 1.15 Pa s.

The viscosity of the dispersions can be preferably lowered not only by diluting the paste or viscous lacquer in the usual way and by coating at an II, appropriate temperature (typically about 60° C.) but also by using special lacquer additives. As an example, the rheological behavior of a high-dilatancy dispersion or lacquer can be further improved by addition of 9 wt % of a formulation such as DPGDA containing 30 wt % of Aerosil OX 50 and 9 wt % of DYNASYLAN VTMO.

Lacquer systems containing DYNASYLAN® PTMO as silane component can exhibit dilatancy. Particularly preferable rheological behavior can be achieved by using mixtures of DYNASYLAN® PTMO with addition of VTMO or a corresponding oligomeric alkoxysiloxane with propyl or vinyl functions or mixtures thereof. Thus a mixture of, for example, PTMO and VTMO or alkoxysiloxanes with propyl functions or alkoxysiloxanes with vinyl functions or alkoxysiloxanes with propyl and vinyl functions—to mention only a few examples—or mixtures thereof are preferred as the silico-organic component in the present invention.

The use of oligomeric organoalkoxysilanes, such as selectively prepared condensates or cocondensates, for example starting from at least one n-propyltrialkoxysilane, perfluoro-1,1,2,2-tetrahydroalkyltrialkoxysilane, phenyltrialkoxysilane, 3-methacryloxypropyltrialkoxysilane and/or vinyltrialkoxysilane, each of which leads to corresponding organofunctional alkoxysiloxanes, is also particularly preferred, since the said siloxanes, as opposed to the monomeric silanes, are practically nonvolatile and thus do not evaporate under processing conditions, so that preferably losses of starting materials are not suffered in the present method. The ethoxy and methoxy groups are preferred as alkoxy groups for this purpose.

Preferably, the said coating is appropriately cured photochemically by UV irradiation or by irradiation with electron beams. The irradiation is usually performed at a temperature of 10 to 60° C., advantageously at ambient temperature. These ranges include all values and subranges therebetween, including 15, 20, 25, 30, 35, 40, 45, 50 and 55° C.

According to the invention, therefore, it is possible in simple and economic manner, using pastes containing silico-organic nanohybrid/microhybrid capsules, to prepare coating agents, with which coatings having excellent scratch resistance and abrasion resistance can be produced.

One preferred embodiment of the present invention includes therefore a substantially particularly homogeneous, highly filled pasty composition (also referred to as paste for short) containing silico-organic nanohybrid and/or microhybrid capsules for scratch-resistant and/or abrasion-resistant coatings, wherein a silico-organic nanohybrid or microhybrid capsule comprises an oxide core A, which contains at least one nanoscale or microscale oxide particle (KA-O) of component (a) and/or (b) and a silico-organic shell B, and the silico-organic shell B contains at least one silico-organic constituent of general formula 1a

(Si'O—)$_x$Si—R    (Ia), wherein R denotes an organofunctional group, as also follows from formula II in the form of R$^1$ and R$^2$, and x is a number from 0 to 20, the remaining free valences of Si are saturated by SiO— and/or -Z and the free valences of Si' are saturated by SiO—, —R and/or -Z, the groups Z are the same or different and denote hydroxy or alkoxy substituents, and each Si or Si' of shell B carries at most one group R, and/or the silico-organic constituent of shell B is bound to core A (KA-0) by one or more covalent bonds of general formula Ib

(KA-O)—((Si'O—)$_x$Si—R)    (Ib), wherein R has the aforesaid meaning and x is a number from 0 to 20, the remaining free valences of Si are saturated by (KA-O)—, SiO— and/or -Z and the free valences of Si' are saturated by (KA-O)—, SiO—, —R and/or -Z, the groups Z are the same or different and denote hydroxy or alkoxy substituents, and each Si or Si' of shell B carries at most one group R, obtainable by reaction of (i) oxide particles from the series comprising
 (a) at least one nanoscale oxide and/or mixed oxide of at least one metal or semimetal of the second to sixth main group or of the first to eighth subgroup of the periodic table or of the lanthanides or
 (b) a microscale corundum or
 (c) a mixture of oxide particles of (a) and (b), with
(ii) at least one organofunctional silane of general formula II

R$^1_s$R$^2_r$SiY$_{(4-s-r)}$    (II), wherein the groups R$^1$ and R$^2$ are the same or different and each represents a straight-chain, branched or cyclic alkyl group with 1 to 50 C atoms, preferably with 1 to 16 C atoms, an alkenyl group with 2 to 6 C atoms, a chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, Y represents a methoxy, ethoxy, i-propoxy, n-propoxy or 2-methoxyethoxy group and s is equal to 1 or 2 or 3 and r is equal to 0 or 1 or 2, with the proviso that (s+r)≦3, and (iii) if necessary a monomeric and/or oligomeric silicic acid ester, which carries methoxy, ethoxy, n-propoxy or i-propoxy groups and has an average degree of oligomerization of 1 to 50, for example tetra methoxysilane, such as DYNASIL® M, tetraethoxysilane, such as DYNASIL® A, tetrapropoxysilane, such as DYNASIL® P, or an oligomeric ethyl silicate, such as DYNASIL® 40, and (iv) if necessary an organofunctional siloxane, whose functionalities are the same or different and each Si atom in the siloxane carries a functionality from the series comprising alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloxyalkyl, methacryloxyalkyl, mercaptoalkyl, ureidoalkyl, aryl or alkoxy and the remaining free valences of the Si atoms in the siloxane are saturated by methoxy or ethoxy or hydroxy groups, the preferred siloxanes being such with an average degree of oligomerization of 1 to 20, preferably with an average degree of oligomerization of 2 to 10, as can be inferred in particular from German Patent Applications 19955047, 19961972, 10056343, 10151264 and 10202389 and from European Patents 0518057, 0590270, 0716127, 0716128, 0760372, 0814110, 0832911, 0846717, 0846716, 0846715, 0953591, 0955344, 0960921, 0978525, 0930342, 0997469, 1031593 and 0075697, the entire contents of each of which are hereby incorporated by reference, wherein the reaction is performed in situ in a liquid, curable synthetic resin or a precursor stage of a synthetic resin, the content of oxide particles of component (i) is 10 to 300 parts by weight relative to 100 parts by weight of the synthetic-resin component used, and the reaction is performed in a kneading or dispersing machine with appropriate dispersing effect.

Referring to the Periodic Table, of which the version disclosed in *The Merck Index*, 11$^{th}$ ed., Merck & Co. 1989 is hereby incorporated in its entirety by reference, the term, "main groups 2 to 6" refers to groups IIa, IIIa, IVa, Va and VIa, respectively; and the term, "transition groups 1 to 8" refers to groups Ib, IIb, IIIb, IVb, Vb, VIb, VIIb and VIII, respectively; and lanthanides refer to any of elements 57–71.

Preferably, in the compounds of formulas (Ia) and/or (Ib), the Si and Si' are tetravalent silicons.

In the present invention, kneading machines are to be understood as processing units which, besides the usual mixing effect, have a kneading effect and possibly an additional dispersing effect, or in other words effects that contribute to homogenization of the highly filled synthetic-resin mass. A preferred machine for preparing the inventive paste is a cylinder mill, cone mixer, extruder with mixing and kneading function, kneader or powerful dispersing machine.

Preferred alkoxy substituents of groups Z include straight-chain, cyclic or branched alkyl substituent with 1 to 18 C atoms, while methoxy, ethoxy, i-propoxy or n-propoxy groups are particularly preferred. The aforementioned range includes all values and subranges therebetween, including 2, 3, 4, 5, 6, 7, 8, 9, 10, 11, 12, 13, 14, 15, 16, and 17 C atoms.

In the silico-organic nanohybrid or microhybrid capsules, the weight ratio of core A to shell B is preferably 0.5:1 to 100:1, particularly preferably 1:1 to 2:1. These ranges include all values and subranges therebetween, including 0.7, 1.1, 1.5, 3, 5, 10, 20, 40, 50, 20 60, 70, 80 and 90:1. In a particularly preferred version of the inventive method, there is used a starting-material ratio of oxide component (i), silico-organic components (ii) to (iv), and synthetic-resin components corresponding to 0.2:0.5:1 to 3:1:1 parts by weight, especially to 1:1:1 to 2:1:1 parts by weight. At the same time, the weight ratio of silico-organic components (ii), (iii) and (iv) relative to one another can range from 1:0:0 through 1:1:0 and 1:0:1 and 0:1:1 to 0:0:1. These ranges include all values and subranges therebetween, including (independently for each of (ii), (iii), and (iv) in the relative ratio (ii):(iii):(iv)) 0.1, 0.2, 0.3, 0.4, 0.5, 0.6, 0.7, 0.8 and 0.9.

The core A of the inventive silico-organic nanohybrid/ microhybrid capsules preferably includes at least one nanoscale oxide and/or mixed oxide, including oxyhydroxides, selected from the group including Si, Al, Ti and/or Zr, for example $SiO_2$, such as pyrogenic silica, silicates, aluminum oxide, aluminum hydroxide, aluminosilicates, $TiO_2$, titanates, $ZrO_2$ or zirconates, or it includes a microscale corundum particle. Mixtures are possible.

According to the invention, there is preferably used as component (a) of this oxide particle mixture (i) at least one nanoscale oxide and/or mixed oxide selected from the group including Si, Al, Ti and/or Zr, and combinations thereof, and the nanoscale oxide preferably having an average particle size of 1 to 200 nm. A nanoscale silica is used particularly preferably as component (a). More preferably, the nanoscale oxide has an average particle size of 2 to 195 nm. The above ranges include all values and subranges therebetween, including 5, 10, 25, 50, 75, 90, 100, 125, 150, 175, and 190 nm.

Furthermore, there is preferred as component (b) of oxide particle mixture (i) a microscale corundum ($\alpha$-$Al_2O_3$), which preferably has an average particle size of 3 to 40 μm, particularly preferably 9 to 18 μm and most particularly preferably 12 to 15 μm. These ranges include all values and subranges therebetween, including 4, 5, 7, 10, 14, 16, 20, 22, 25, 30, 35 and 37 μm.

Another preferred embodiment of the invention includes a method for preparing a pasty composition containing silico-organic nanohybrid and/or microhybrid capsules for scratch-resistant and/or abrasion-resistant coatings, characterized in that there are reacted
(i) oxide particles selected from the group including:
   (a) at least one nanoscale oxide and/or mixed oxide of at least one metal or semimetal of the second to sixth main group or of the first to eighth subgroup of the periodic table or of the lanthanides or
   (b) a microscale corundum or
   (c) a mixture of oxide particles of (a) and (b);
with
(ii) at least one organofunctional silane of general formula II $$R^1_sR^2_rSiY_{(4-s-r)} \quad (II),$$

wherein the groups $R^1$ and $R^2$ are the same or different and each represents a straight-chain, branched or cyclic alkyl group with 1 to 50 C atoms, an alkenyl group with 2 to 6 C atoms, a chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, Y represents a methoxy, ethoxy, i-propoxy, n-propoxy or 2-methoxyethoxy group and s is equal to 1 or 2 or 3 and r is equal to 0 or 1 or 2, with the proviso that $(s+r) \leq 3$;
and
(iii) if necessary a monomeric and/or oligomeric silicic acid ester; which carries methoxy, ethoxy, n-propoxy or i-propoxy groups and has an average degree of oligomerization of 1 to 50;
and
(iv) if necessary an organofunctional siloxane, whose functionalities are the same or different and each Si atom in the siloxane carries a functionality selected from the group including alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloxyalkyl, methacryloxyalkyl, mercaptoalkyl, ureidoalkyl, aryl or alkoxy and the remaining free valences of the Si atoms in the siloxane are saturated by methoxy or ethoxy or hydroxy groups;
in situ in a liquid, curable synthetic resin or a precursor stage of a synthetic resin, the content of oxide particles of component (i) is 10 to 300 parts by weight relative to 100 parts by weight of the synthetic-resin components used, and the reaction is performed in a kneading or dispersing machine, preferably in a Torusmill®, using exclusively the dissolver.

A preferred procedure for performing the inventive method is as follows:
the curable synthetic resin or a precursor stage of a curable synthetic resin is placed in a kneading or dispersing machine and heated, preferably to 50 to 90° C., particularly preferably to 60 to 80° C., most particularly preferably to 65 to 75° C., especially to >70° C.,
catalyst and if necessary surfactant and water is added,
components (ii) to (iv) are introduced and then
oxide particles (i) are added while thoroughly intermixing.

Thereafter alcohol formed during the reaction is removed appropriately from the system, the mass is allowed to cool and an inventive pasty composition is obtained.

In the inventive method, there are preferably used as the curable synthetic resin or precursor stage of a curable synthetic resin an acrylate, methacrylate, epoxide, epoxy resin, polyurethane, polyurethane resin, unsaturated polyester, unsaturated polyester resin, epoxy acrylate, polyester acrylate, urethane acrylate, silicone acrylate or mixtures of two or more of the foregoing components.

Preferable organofunctional silanes according to formula II include one or more of the following compounds: methyltrimethoxysilane (DYNASYLAN® MTMS), methyltriethoxysilane (DYNASYLAN® MTES), propyltrimethoxysilane (DYNASYLAN® PTMO), propyltriethoxysilane (DYNASYLAN® PTEO), i-butyltrimethoxysilane (DYNASYLAN® IBTMO), i-butyltriethoxysilane (DYNASYLAN® IBTEO), octyltrimethoxysilane (DYNASYLAN® OCTMO), octyltriethoxysilane (DYNASYLAN® OCTEO), hexadecyltrimethoxysilane (DYNASYLAN® 9116), hexadecyltriethoxysilane (DYNASYLAN® 9216), 3-chloropropyltrialkoxysilanes, 3-bromopropylalkoxysilanes, 3-iodopropylalkoxysilanes, 3-chloropropyltrichlorosilanes, 3-chloropropylmethyldialkoxysilanes, 3-chloropropylmethyldichlorosilanes, 3-chloropropyidimethyl-alkoxysilanes, 3-chloropropyldimethylchlorosilanes, 3-aminopropylmethyidialkoxysilanes, 3-aminopropyltrialkoxysilanes, including 3-aminopropyltrimethoxysilane (DYNASYLAN® AMMO), 3-aminopropyltriethoxysilane (DYNASYLAN® AMEO), N-(n-butyl)-3-amino-propyltrimethoxysilane (DYNASYLAN® 1189), N-aminoethyl-3-aminopropylmethyl-dimethoxysilane (DYNASYLAN® 1411), 3-aminopropylmethyldiethoxysilane (DYNASYLAN® 1505), N-aminoethyl-3-aminopropylmethyldialkoxysilane, N-aminoethyl-3-aminopropyltrimethoxysilane (DYNASYLAN® DAMO), triaminofunctional propyltrimethoxysilane (DYNASYLAN® TRIAMO), including (N-aminoethyl-N'-(3-trialkoxysilyipropyl))ethylenediamines as well as (N-aminoethyl-N-(3-trialkoxysilylpropyl))ethylenediamines, triaminofunctional propylmethyldialkoxysilanes, 3-(4,5-dihydroimidazolyl) propyltriethoxysilane (DYNASYLAN® IMEO), 3-methacryloxypropylalkoxysilanes, 3-methacryloxypropyltrimethoxysilane (DYNASYLAN® MEMO), 3-methacryloxyisobutyltrialkoxysilanes, 3-glycidyloxypropyltrialkoxysilanes, 3-glycidyloxypropyltrimethoxysilane (DYNASYLAN® GLYMO), 3-glycidyloxypropyltriethoxysilane (DYNASYLAN® GLYEO), 3-glycidyloxypropylmethyldiethoxysilane, 3-mercaptopropyl-alkoxysilanes, 3-mercaptopropyltrimethoxysilane (DYNASYLAN® MTMO), vinyl-trialkoxysilanes, including vinyltrimethoxysilane (DYNASYLAN® VTMO), vinyltriethoxysilane (DYNASYLAN® VTEO), vinyltris(2-methoxyethoxy) silane (DYNASYLAN® VTMOEO), perfluoroalkyltrialkoxysilanes, fluoroalkyltrialkoxysilanes, including tridecafluorooctyltrimethoxysilane, tridecafluorooctyltriethoxysilane (DYNASYLAN® F 8261), tridecafluorooctylmethyldialkoxysilanes, trimethylchlorosilane, triethylchlorosilane, $(H_5C_2O)_3Si(CH_2)_3—S_4(CH_2)_3Si(OC_2H_5)_3$ 1,4-bis(3-triethoxysilylpropyl)tetrasulfane (Si-69), $(H_5C_2O)_3Si(CH_2)_3$ NCS 3-thiacyamidopropyltriethoxysilane (Si-264), $(H_5C_2O)_3Si(CH_2)_3$ $S_2(CH_2)_3Si(OC_2H_5)_3$ 1,2-bis(3-triethoxysilylpropyl)disulfane (Si-266), 3-cyanopropyltrialkoxysilanes, including 3-cyanopropyltrimethoxysilane, N,N',N"-tris(trimethoxysily-propyl)triisocyanurate, 3-(methoxy(polyethyleneglycido))propyltrialkoxysilanes, allyl-trialkoxysilanes, allylmethyldialkoxysilane, allyldimethylalkoxysilane, 3-methacryloxy-2-methylpropyltrialkoxysilanes, 3-amino-2-metliylpropyltrialkoxysilanes, (cyclohex-3-enyl)-ethyltrialkoxysilanes, N-(3-trialkoxysilylpropyl)alkyl carbamates, 3-azidopropyltrialkoxysilanes, 4-(2-trialkoxysilylethyl)-1,2-epoxycyclohexanes, bis(3-alkoxysilylpropyl)amines, tris(3-alkoxysilylpropyl)amines, 3-acryloxypropyltrialkoxysilanes, including 3-acryloxymethyldialkoxysilane and 3-acryloxydimethylalkoxysilane, wherein methoxy, ethoxy, 2-methoxyethoxy, propoxy or acetoxy are preferable as the foregoing alkoxy groups. Mixtures are possible.

Particularly preferable component (ii) compounds include 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-methacryloxy-2-methylpropyltrimethoxysilane, 3-methacryloxy-2-methylpropyltriethoxyvinyltrimethoxysilane, vinyltriethoxysilane, vinyl methyldimethoxysilane, vinyl methyldiethoxysilane, phenyltrimethoxysilane, phenyltriethoxysilane, n-propyltrimethoxysilane and/or n-propyltriethoxysilane or a mixture of the foregoing silanes. A mixture of an n-propylalkoxysilane and a vinylalkoxysilane is particularly preferred.

Preferably component (iv) compounds include an oligomeric vinyltrimethoxysilane (DYNASYLAN® 6490), an oligomeric propyltrimethoxysilane, an oligomeric vinyltrimethoxysilane, an oligomeric 3-methacryloxypropyltrimethoxysilane or a cooligomer of propyltrimethoxysilane and vinyltrimethoxysilane, of 3-methacryloxypropyltrimethoxysilane and propyltrimethoxysilane, or of 3-methacryloxypropyltrimethoxysilane and phenyltrimethoxysilane or of 3-methacryloxypropyltrimethoxysilane and tridecafluoro-1,1,2,2-tetrahydrooctyltriethoxysilane or of 3-methacryloxypropyltrimethoxysilane and tridecafluoro-1,1,2,2-tetrahydrooctyltrimethoxysilane or of vinyltrimethoxysilane and tridecafluoro-1,1,2,2-tetrahydrooctyltrimethoxysilane or of vinyltrimethoxysilane and tridecafluoro-1,1,2,2-tetrahydrooctyltriethoxysilane, to mention only a few preferred examples. It is also possible, however, to use cooligomers obtained from more than two of the foregoing monomeric organoalkoxysilanes (ii) as well as (iii), in which case such a cooligomer preferably carries at least one vinyl or 3-methacryloxypropyl group.

Preferably, in the inventive method, the usually liquid components of the prepolymer are generally placed first in the kneading or dispersing machine and heated therein, a specified quantity of water, and if necessary a catalyst, and if necessary a surfactant and silico-organic components (ii) to (iv) are added, and then component (i), in the form of a mixture of oxides (a) and (b), for example, are added with thorough intermixing. Thus the synthetic-resin components, catalyst, surfactant, water and the silico-organic components and if necessary further auxiliary substances are first brought together appropriately and mixed, and (preferably) only thereafter are oxide components (i) added, the component mixture obtained by this preparation procedure also being characterized in particular by good processability. The alcohol formed during the reaction can be removed from the mass during the reaction, or preferably thereafter. The mixture is then allowed to cool appropriately, and an inventive mass is obtained.

In the inventive method there are used preferably 35 to 200 parts by weight, particularly preferably 60 to 180 parts by weight, most particularly preferably 80 to 160 parts by weight, especially >80 to 140 parts by weight, for example 90 to 120 parts by weight of oxide components of oxide particles (i) (KA-O) relative to 100 parts by weight of the synthetic resin. These ranges include all values and subranges therebetween, including 36, 38, 40, 45, 50, 59, 62, 70, 79, 82, 85, 95, 105, 115, 125, 135, 142, 150, 165, 175, 185 and 190 parts by weight oxide components of oxide particles (i) (KA-O) relative to 100 parts by weight of the synthetic resin.

For this purpose component (a) or (b) can preferably be used alone. If a mixture (c) of (a) and (b) is used, a weight ratio (a):(b) of 1:10 to 5:1 is preferred. Particularly preferably there is used an oxide particle mixture (c) with a weight ratio of components (a) and (b) of 1:3 to 1:1, most particularly preferably a weight ratio (a):(b) of 1:2.

In the inventive method there is preferably used a nanoscale oxide and/or mixed oxide (a) with an average particle diameter of 1 to 100 nm, particularly preferably of 5 to 50 nm and most particularly preferably of 10 to 40 nm. These ranges include all values and subranges therebetween, including 2, 3, 4, 8, 9, 12, 15, 20, 25, 30, 35, 45, 55, 60, 65, 75, 80, 85, 90, and 95 nm. In this connection the oxides or mixed oxides preferably have a BET surface area of 40 to 400 m$^2$/g, preferably of 60 to 250 m$^2$/g, particularly preferably of 80 to 250 m$^2$/g. These ranges include all values and subranges therebetween, including 42, 45, 50, 65, 75, 85, 90, 100, 125, 150, 175, 195, 200, 225 and 245 m$^2$/g. Preferable nanoscale oxides or mixed oxides include pyrogenic silica, which can be modified by further metal or semimetal constituents, such as aluminum, titanium, iron or zirconium. Mixtures are possible.

As oxide component (b) there is preferably used a microscale corundum with an average particle size $d_{50}$ of 9 to 15 μm, which range includes all values and subranges therebetween, including 10, 11, 12, 13, and 14.

Furthermore, it is preferred that oxide component (i), which may include individual components (a) or (b) or (c) and at least one silane-based component, especially (ii), (iii) and/or (iv), be used in a weight ratio of 100:1 to 0.5:1, particularly preferably of 10:1 to 0.5:1, most particularly preferably of 3:1 to 1:1. These ranges include all values and subranges therebetween, including 99, 95, 90, 80, 70, 60, 50, 40, 30, 20, 11, 9, 7, 5, and 0.7.

Preferred examples of the liquid or curable synthetic resin or of the precursor stage of a liquid curable synthetic resin, or in other words a prepolymer or a mixture of prepolymers, include one or more acrylates, methacrylates, epoxides, epoxy resins, polyurethanes, polyurethane resins, unsaturated polyesters, unsaturated polyester resins, epoxyacrylates, polyester acrylates, urethane acrylates, silicone acrylates, polyfunctional monomeric acrylates, such as trimethylolpropane triacrylate, trimethylolpropane trimethacrylate, ethoxylated trimethylolpropane triacrylate, propoxylated trimethylolpropane triacrylate, pentaerythritol triacrylate, ethoxylated pentaerythritol tetraacrylate, alkoxylated tetraacrylates, di-trimethylolpropane tetraacrylates, 3,4-epoxycyclohexane-1-carboxylic acid 3,4-epoxycyclohexyl-1'-methyl ester, 1,6-hexanediol diacrylate—to mention only a few examples—or mixtures of two or more of the foregoing synthetic resins or prepolymers, for example mixtures of monofunctional and/or bifunctional and polyfunctional monomeric acrylates, which if necessary have low viscosity.

Preferably, the inventive reaction usually takes place in the presence of a well defined quantity of water. For this purpose there is appropriately used 1 to 6 mole of water per mole of Si of the silico-organic component. This range includes all values and subranges therebetween, including 1.1, 1.5, 2, 2.5, 3, 3.5, 4, 4.5, 5, and 5.5 mole of water per mole of Si of the silico-organic component.

Preferably, in the present method, the reaction takes place in the presence of specified quantities of water. Per mole of a hydrolyzable Si-bound group of the silico-organic component there is preferably used 0.5 to 6 mole of water, particularly preferably 0.5 to 4 mole of water, most particularly preferably 1 to 2 mole of water. These ranges include all values and subranges therebetween, including 0.6, 0.7, 0.8, 0.9, 1.1, 1.5, 2, 2.5, 3, 3.5, 4, 4.5, 5, and 5.5 mole of water per mole of a hydrolyzable Si-bound group of the silico-organic component.

The inventive reaction is preferably performed in the presence of one or more catalysts. An acid is preferable as the catalyst, more preferably maleic anhydride, maleic acid, acetic acid, acetic anhydride, glycolic acid, citric acid, methanesulfonic acid, phosphoric acid. Mixtures are possible.

A surfactant is preferable in performing the inventive reaction. For example, the reaction is preferably performed in the presence of sodium dodecyl sulfate.

In the inventive method, the reaction is preferably performed at a temperature in the range of 30 to 100° C., preferably at a temperature in the range of 40 to 90° C., particularly preferably at 50 to 80° C., especially at 60 to 75° C. These ranges include all values and subranges therebetween, including 35, 45, 55, 65, and 85° C.

During the inventive reaction, an alcohol is usually formed by hydrolysis and condensation, and is preferably removed from the reaction system during the reaction and/or thereafter. Removal of the alcohol formed during the reaction can be accomplished by distillation, appropriately under reduced pressure. In the process, the content of alcohol in the product mixture, or in other words in the composition obtained by the inventive reaction, is usually lowered to <2 wt %, preferably to 0.01 to 1 wt %, particularly preferably to 0.1 to 0.5 wt %, so that a solvent-free composition, or in other words a solvent-free paste is advantageously obtained. These ranges include all values and subranges therebetween, including 0.02, 0.05, 0.07, 0.09, 0.11, 0.15, 0.17, 0.19, 0.3, 0.7, 0.9, 1.1, 1.2, 1.5, 1.7 and 1.9 wt %.

Compositions according to the invention are especially suitable as additives or as base components for preparation of a coating composition or of a lacquer for production of scratch-resistant or abrasion-resistant coatings.

In general, inventive compositions can be used for preparation of coating agents and can preferably be cured by radical, thermal and/or photochemical or radiochemical methods.

Further components such as initiators for UV or photochemical lacquer curing, Darocur® 1173, Lucirin® TPO-L, lacquer stabilizers, such as HALS compounds, Tinumne® as well as antioxidants such as Irganox® can be added optionally and appropriately to the inventive composition or to the lacquer obtainable therefrom. Such additives are usually used in proportions of 0.1 to 5 wt %, preferably of 2 to 3 wt % relative to the formulation or to the lacquer. The incorporation of further components in the lacquer system is achieved appropriately with thorough intermixing. The inventive formulations or lacquers are advantageously characterized, despite a high content of silico-organic nanohybrid or microhybrid crystals, by a relatively low viscosity of preferably 500 to 1000 mPa s. In the process, the systems usually exhibit dilatancy. The above ranges include all values and subranges therebetween, including 0.2, 0.5, 0.9, 1, 1.5, 2.5, 3.5, and 4.5 wt % of additives relative to the formulation or to the lacquer, and including 550, 600, 650, 700, 750, 800, 850, 900 and 950 mPa s for the viscosity.

Another preferred embodiment of the invention is the use of an inventive pasty composition containing silico-organic nanohybrid and/or microhybrid capsules for preparation of a lacquer for production of scratch-resistant and/or abrasion-resistant coatings.

Another preferred embodiment of the invention is the use for preparation of the lacquer, wherein the pasty composition containing silico-organic nanohybrid and/or microhybrid capsules is diluted simply and economically with stirring by using a liquid synthetic resin, a precursor compound of a synthetic resin and/or a solvent.

The composition or a lacquer prepared therefrom or modified thereby is preferably employed by application on a substrate. The standard coating methods, such as roller application, doctoring, immersion, flooding, pouring, spraying and brushing are preferable for coating of substrates.

For example, the lacquer can be applied uniformly by means of a roller applicator on strip-like substrates such as paper or such as metal or plastic sheets, after which it can be cured. The solvent-free lacquer can also be processed without addition of solvents by using conventional spraying systems in the spray method. Thereby it is possible to coat and cure three-dimensional substrates. The coating can be appropriately cured at ambient temperature, or in other words lacquer temperature, by a UV or electron-beam (EBC) method, which is nonpolluting because it is solvent-free.

Preferably electrons with an energy of around 140 keV are used for electron-beam curing, in which case the dose ranges from 30 to 60 kGy, preferably 40 to 50 kGy.

Preferably the residual $O_2$ content is <200 ppm. Photochemical curing is performed appropriately under protective gas, such as nitrogen or argon. These ranges include all values and subranges therebetween, including 35, 45, and 55 kGy.

Lacquer curing can also be accomplished, however, by means of UV irradiation, using monochromatic or polychromatic UV lamps with a wavelength of 150 to 400 nm. It is also possible to operate at ambient temperature, for example between 10 and 60° C., during UV curing. In this case also the $O_2$ content is appropriately <200 ppm.

Thus, by using such a lacquer, it is possible in particularly advantageous manner to produce coatings with excellent scratch resistance and abrasion resistance. The scratch hardness or scratch resistance is usually determined in accordance with DIN 53799 (incorporated herein by reference), using a carbide ball. Abrasion can be measured in accordance with DIN 52347 (incorporated herein by reference), for example, using coated plane grinding disks.

Inventive coatings preferably have a layer thickness of 2 to 100 µm, particularly preferably of 5 to 50 µm and most particularly preferably of 5 to 20 µm. These ranges include all values and subranges therebetween, including 3, 4, 7, 9, 10, 15, 25, 35, 45, 55, 65, 75, 85 and 95 µm.

Thus it is possible particularly simply and economically to provide substrates such as metals such as aluminum, iron, steel, brass, copper, silver and magnesium as well as light metal alloys, wood, paper, cardboard, textiles, stoneware, plastics, thermoplastics, polycarbonate, glass and ceramic with a particularly scratch-resistant and abrasion-resistant coating. The choice of the substantially solid substrate materials for coating is unlimited. Such substrates can be provided, for example, with a protective coating that is stable to UV and weathering, in the form of the "top coating" used, for example, as the clear-lacquer system in the automobile industry.

In particular, articles with scratch-resistant and abrasion-resistant finish such as decorative paper, aluminum foils, polycarbonate automobile windows, PVC window frames, doors, sill plates, floor coverings and parquet floors, to mention only a few, can be obtained simply and economically by such a coating method.

Especially preferred embodiments of the invention are recited below in A–V:

A. A highly filled, pasty composition, containing silico-organic nanohybrid and/or microhybrid capsules for scratch-resistant and/or abrasion-resistant coatings, wherein a silico-organic nanohybrid or microhybrid capsule comprises an oxide core A, which contains at least one nanoscale or microscale oxide particle (KA-O) of component (a) and/or (b), and a silico-organic shell B, and the silico-organic shell B contains at least one silico-organic constituent of general formula Ia

$$(Si'O-)_xSi-R \qquad (Ia),$$

wherein R denotes an organofunctional group, and x is a number from 0 to 20, the remaining free valences of Si are saturated by SiO— and/or -Z and the free valences of Si' are saturated by SiO—, —R and/or -Z, the groups Z are the same or different and denote hydroxy or alkoxy substituents, and each Si or Si' of shell B carries at most one group R, and/or the silico-organic constituent of shell B is bound to core A (KA-O) by one or more covalent bonds of general formula 1b

$$(KA-O)-((Si'O-)_xSi-R) \qquad (Ib),$$

wherein R has the aforesaid meaning and x is a number from 0 to 20, the remaining free valences of Si are saturated by (KA-O)—, SiO— and/or -Z and the free valences of Si' are saturated by (KA-O)—, SiO—, —R and/or -Z, the groups Z are the same or different and denote hydroxy or alkoxy substituents, and each Si or Si' of shell B carries at most one group R, obtainable by reaction of (i) oxide particles from the series comprising (a) at least one nanoscale oxide and/or mixed oxide of at least one metal or semimetal of the second to sixth main group or of the first to eighth subgroup of the periodic table or of the lanthanides or (b) a microscale corundum or (c) a mixture of oxide particles of (a) and (b), with (ii) at least one organofunctional silane of general formula II

$$R^1{}_s R^2{}_r SiY_{(4-s-r)} \qquad (II),$$

wherein the groups $R^1$ and $R^2$ are the same or different and each represents a straight-chain, branched or cyclic alkyl group with 1 to 50 C atoms, an alkenyl group with 2 to 6 C atoms, a chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, Y represents a methoxy, ethoxy, i-propoxy, n-propoxy or 2-methoxyethoxy group and s is equal to 1 or 2 or 3 and r is equal to 0 or 1 or 2, with the proviso that (s+r)≦3, and (iii) if necessary a monomeric and/or oligomeric silicic acid ester, which carries methoxy, ethoxy, n-propoxy or i-propoxy groups and has an average degree of oligomerization of 1 to 50, and (iv) if necessary an organofunctional siloxane, whose functionalities are the same or different and each Si atom in the siloxane carries a functionality from the series comprising alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloxyalkyl, methacryloxyalkyl, mercaptoalkyl, ureidoalkyl, aryl or alkoxy and the remaining free valences of the Si atoms in the siloxane are saturated by methoxy or ethoxy or hydroxy groups, wherein the reaction is performed in situ in a liquid, curable synthetic resin or a precursor stage of a synthetic resin, the content of oxide particles of component (i) is 10 to 300 parts by weight relative to 100 parts by weight of the synthetic resin component used, and the reaction is performed in a kneading or dispersing machine.

B. A method for preparing a pasty composition containing silico-organic nanohybrid and/or microhybrid capsules for scratch-resistant and/or abrasion-resistant coatings according to preferred embodiment A,
characterized in that there are reacted
(i) oxide particles from the series comprising
  (a) at least one nanoscale oxide and/or mixed oxide of at least one metal or semimetal of the second to sixth main group or of the first to eighth subgroup of the periodic table or of the lanthanides or
  (b) a microscale corundum or
  (c) a mixture of oxide particles of (a) and (b),
with
(ii) at least one organofunctional silane of general formula II

$$R^1_s R^2_r SiY_{(4-s-r)} \quad (II),$$

wherein the groups $R^1$ and $R^2$ are the same or different and each represents a straight-chain, branched or cyclic alkyl group with 1 to 50 C atoms, an alkenyl group with 2 to 6 C atoms, a chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, Y represents a methoxy, ethoxy, i-propoxy, n-propoxy or 2-methoxyethoxy group and s is equal to 1 or 2 or 3 and r is equal to 0 or 1 or 2, with the proviso that $(s+r) \leq 3$,
and
(iii) if necessary a monomeric and/or oligomeric silicic acid ester, which carries methoxy, ethoxy, n-propoxy or i-propoxy groups and has an average degree of oligomerization of 1 to 50,
and
(iv) if necessary an organofunctional siloxane, whose functionalities are the same or different and each Si atom in the siloxane carries a functionality from the series comprising alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloxyalkyl, methacryloxyalkyl, mercaptoalkyl, ureidoalkyl, aryl or alkoxy and the remaining free valences of the Si atoms in the siloxane are saturated by methoxy or ethoxy or hydroxy groups,
in situ in a liquid, curable synthetic resin or a precursor stage of a synthetic resin, ', the content of oxide particles of component (i) is 10 to 300 parts by weight relative to 100 parts by weight of the synthetic-resin components used, and the reaction is performed in a kneading or dispersing machine.

C. A method according to preferred embodiment B, characterized in that there are used as the curable synthetic resin or precursor stage of a curable synthetic resin an acrylate, methacrylate, epoxide, epoxy resin, polyurethane, polyurethane resin, unsaturated polyester, unsaturated polyester resin, epoxy acrylate, polyester acrylate, urethane acrylate, silicone acrylate or mixtures of two or more of the foregoing components.

D. A method according to preferred embodiments B or C, characterized in that there are used >80 to 200 parts by weight of oxide component (i) relative to 100 parts by weight of the synthetic resin employed.

E. A method according to one of preferred embodiments B to D,
characterized in that the oxide components (i) and at least one silane-based component (ii), (iii) and/or (iv) is used in a weight ratio of 100:1 to 0.5:1.

F. A method according to one of preferred embodiments B to E,
characterized in that there is used as component (a) at least one nanoscale oxide and/or mixed oxide from the series comprising the elements Si, Al, Ti and/or Zr, and the particles have an average particle size of 1 to 200 nm.

G. A method according to one of preferred embodiment B to F, characterized in that a nanoscale silica is used as component (a).

H. A method according to one of preferred embodiments B to G, characterized in that there is used as component (b) a microscale corundum with an average particle size of 3 to 40 μm.

I. A method according to one of preferred embodiment B to H,
characterized in that there is used as component (c) an oxide particle mixture comprising a nanoscale silica (a) and a microscale corundum (b).

J. A method according to one of preferred embodiment B to I, characterized in that there are used as component (ii) 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-methacryloxy-2-methylpropyl-trimethoxysilane, 3-methacryloxy-2-methylpropyltriethoxysilane, vinyltrimethoxysilane, vinyltriethoxysilane, vinyl methyldimethoxysilane, vinyl methyldiethoxysilane, phenyltrimethoxysilane, phenyltriethoxysilane, n-propyltrimethoxysilane or n-propyltriethoxysilane or a mixture of two or more of the foregoing silanes.

K. A method according to one of preferred embodiments B to J, characterized in that there are used as component (iv) at least one n-propylmethoxysiloxane, n-propylethoxysiloxane, vinyl methoxysiloxane, vinylethoxysiloxane, phenyltrimethoxysiloxane, phenyltriethoxysiloxane, perfluoro-1,1,2,2-tetrahydroalkylethoxysiloxane as well as perfluoro-1,1,2,2-tetrahydroalkylmethoxysiloxane, each having 3 to 16 C atoms in the alkyl groups, 3-methacryloxypropylmethoxysiloxane, 3-methacryloxypropylethoxysiloxane, n-propyl/vinylmethoxysiloxane, n-propyl/vinylethoxysiloxane, phenyl/vinylethoxysiloxane, phenyl/vinylmethoxysiloxane, 3-methacryloxypropyl/n-propylmethoxysiloxane, 3-methacryloxypropyl/n-propylethoxysiloxane, 3-methacryloxypropyl/phenylethoxysiloxane, 3-methacryloxypropyl/phenylethoxysiloxane, 3-methacryloxypropyl/tridecafluoro-1,1,2,2-tetrahydrooctylmethoxysiloxane, 3-methacryloxypropyl/tridecafluoro-1,1,2,2-tetrahydrooctylethoxysiloxane, vinyl/ tridecafluoro-1,1,2,2-tetrahydrooctylmethoxysiloxane, vinyl/tridecafluoro-1,1,2,2-tetrahydrooctylethoxysiloxane or a mixture thereof.

L. A method according to one of preferred embodiments B to K, characterized in that the reaction is performed in the presence of a catalyst.

M. A method according to one of preferred embodiments B to L, characterized in that the reaction is performed in the presence of a surfactant.

N. A method according to one of preferred embodiment B to M, characterized in that the reaction is performed in the presence of water.

O. A method according to one of preferred embodiments B to N, characterized in that there is used 0.5 to 6 mole of water per mole of Si of the silico-organic component (ii).

P. A method according to one of preferred embodiments B to O, characterized in that the reaction is performed at a temperature in the range of 30 to 100° C.

Q. A method according to one of preferred embodiments B to P, characterized in that the curable synthetic resin or a precursor stage of a curable synthetic resin is placed in a kneading or dispersing machine and heated, catalyst and if necessary surfactant and water is added, components (ii) to (iv) are introduced and then—oxide particles (i) are added while thoroughly intermixing.

R. A method according to preferred embodiment Q, characterized in that the curable synthetic resin or a precursor compound of a curable synthetic resin is heated to a temperature in the range of 50 to 90° C.

S. A method according to preferred embodiments P or Q, characterized in that the curable synthetic resin or a precursor compound of a curable synthetic resin is heated to a temperature in the range of 65 to 75° C.

T. A method according to one of preferred embodiments B to S, characterized in that the alcohol formed is removed from the reaction system during the reaction and/or thereafter, U. The use of a pasty composition containing silico-organic nanohybrid and/or microhybrid capsules according to preferred embodiment A or of a corresponding composition prepared according to one of preferred embodiments B to T for preparation of a lacquer for production of scratch-resistant and/or abrasion-resistant coatings.

V. The use according to preferred embodiment U, wherein, for preparation of the lacquer, the pasty composition containing silico-organic nanohybrid and/or microhybrid capsules is diluted by using a liquid synthetic resin, a precursor compound of a synthetic resin and/or a solvent.

EXAMPLES

Having generally described this invention, a further understanding can be obtained by reference to certain specific examples which are provided herein for purposes of illustration only and are not intended to be limiting unless otherwise specified.

Starting Materials:

Ebecryl® EB 1290: hexafunctional aliphatic urethane acrylate of UCB Chemicals Co.

Ebecryl® EB 5129: mixture of aliphatic urethane acrylate and pentaerythritol tri/tetraacetate of UCB Chemicals Co.

CN 936: aliphatic urethane diacrylate of Cray Valley Co.

DPGDA: dipropylene glycol diacrylate of UCB Chemicals Co.

HDDA: 1,6-hexanediol diacrylate of UCB Chemicals Co.

SR 444: mixture of pentaerythritol triacetate and tetraacetate of Cray Valley Co.

DYNASYLAN® VTMO: vinyltrimethoxysilane of Degussa AG.

DYNASYLAN® 6490: mixture of oligomeric vinyltrimethoxysilanes with a degree of oligomerization of 2 to 12—condensate of Degussa AG.

Plakor® 13: synthetic corundum (corundum micropowder, $d_{50}$=13 μm) of ESK-SIC GmbH.

AEROSIL® OX 50: pyrogenic silica (amorphous, BET 50 $m^2$/g, $d_{50}$=30 nm)

AEROSIL® 200: pyrogenic silica (amorphous, BET=200 $m^2$/g, $d_{50}$=30 nm) of Degussa AG.

Example 1

Preparation of the Paste:

3 kg of CN936 together with 9.1 g of 4-hydroxyanisole were placed in a laboratory kneader (Werner and Pfleiderer Co.) and heated to 60 to 65° C. To the heated acrylate there were added, with intensive kneading, a solution of 90 g of maleic anhydride in 0.75 kg of water within 5 minutes and 3 kg of DYNASYLAN® VTMO within 30 minutes. Then, while kneading was continued and the temperature maintained in the aforesaid range, 3 kg of AEROSIL® OX50 was proportioned in within one hour. To achieve extensive hydrolytic condensation of the silane and removal of methanol/water, the kneading process was continued for another two hours at 65 to 70° C. under reduced pressure (about 50 to 100 torr). Finally the batch was cooled to room temperature.

Preparation of the Ready-to-use Lacquer:

1 kg of SR444 was heated to about 40° C. in a stirred vessel. Then, while intensive stirring was continued, 667 g of the paste obtained in the foregoing was introduced at the same temperature within 30 minutes. After one further hour of stirring, the batch was cooled to room temperature.

Example 2

Preparation of the Paste:

3 kg of EB 1290 together with 9.5 g of 4-hydroxyanisole were placed in a laboratory i kneader (Werner and Pfleiderer Co.) and heated to 60 to 65° C. To the heated acrylate there were added, with intensive kneading, a solution of 28.5 g of maleic anhydride in 0.26 kg of water within 5 minutes and 0.949 kg of DYNASYLAN® VTMO within 30 minutes. Then, while kneading was continued and the temperature maintained in the aforesaid range, 1.323 kg of Plakor® 13 and 1.853 kg of AEROSIL® OX50 were proportioned in within one hour. To achieve extensive hydrolytic condensation of the silane and removal of methanol/water, the kneading process was continued for another two hours at 65 to 70° C. under reduced pressure (about 50 to 100 torr). Finally the batch was cooled to room temperature.

Preparation of the Ready-to-use Lacquer:

1.412 kg of DPGDA was heated to about 40° C. in a stirred vessel. Then, while intensive stirring was continued, the entire quantity of the paste obtained in the foregoing was introduced at the same temperature within one hour. After one further hour of stirring, the batch was cooled to room temperature.

Comparison Example for Example 2

15.78 kg of EB 1290 and 7.43 kg of DPGDA together with 48 g of 4-hydroxyanisole were placed in a stirred vessel and heated to 65 to 70° C. To the heated acrylate there were added a solution of 0.15 kg of maleic anhydride in 1.364 kg of water and, within 30 minutes, 4.988 kg of DYNASY- LAN® VTMO. Then, under intensive stirring, while the temperature was maintained in the aforesaid range, 6.96 kg of Plakor® 13 and 9.74 kg of AEROSIL® OX 50 were proportioned in within one hour. Stirring was continued for one further hour at 65 to 70° C., and then the methanol formed by hydrolysis of the silane was distilled off in vacuum. Finally the batch was cooled to room temperature.

Example 3

Preparation of the Paste:

11.22 kg of Ebecryl® 5129 together with 43.2 g of 4-hydroxyanisole were placed in a Torusmill® 20 C (VMA-Getzmann GmbH) and heated to 75° C. under stirring (typically 500 to 1000 rpm, dissolver). To the heated acrylate there were added a solution of 135 g of malefic acid in 0.81 kg of water and, within 5 to 10 minutes, 2.98 kg of DYNASYLAN® 6490. Then, at the aforesaid temperature and a stirring speed of 1000 to 2000 rpm (dissolver), 5.97 kg of AEROSIL® 200 was proportioned in at such a rate that the reaction mixture could still be readily stirred, for which a proportioning time of 3 to 4 hours was necessary. During the second half of the AEROSIL proportioning process, it was also necessary to add HDDA periodically, in order to ensure stirrability, a total of 3.3 kg of HDDA being consumed for this purpose. By means of the dissolver, stirring was continued for another 2 hours at 75° C. and 2000 to 3000 rpm, after which the lacquer, which still flowed freely, was transferred into a suitable vessel and allowed to cool to room temperature, gradually solidifying to a pasty mass.

Preparation of the ready-to-use lacquer from the paste prepared according to Example 3:

Example 3.1

0.374 kg of HDDA was heated to about 40° C. in a stirred vessel. Then, while intensive stirring was continued, 1 kg of paste was introduced at the same temperature within 30 minutes. After one further hour of stirring, the batch was cooled to room temperature.

Example 3.2

0.279 kg of HDDA was heated to about 40° C. in a stirred vessel. Then, while intensive stirring was continued, 1 kg of paste was introduced at the same temperature within minutes. After one further hour of stirring, the batch was cooled to room temperature.

Example 3.3

0.209 kg of HDDA was heated to about 40° C. in a stirred vessel. Then, while intensive stirring was continued, 1 kg of paste was introduced at the same temperature within 30 minutes. After one further hour of stirring, the batch was cooled to room temperature.

Example 4

11.22 kg of Ebecryl® 1290 together with 43.2 g of 4-hydroxyanisole were placed in a Torusmill® 20 C (VMA-Getzmann GmbH) and heated to 75° C. under stirring (typically 500 to 1000 rpm, dissolver). To the heated acrylate there were added a solution of 135 g of malefic acid in 0.81 kg of water and, within 5 to 10 minutes, 2.98 kg of DYNASYLAN® 6490. Then, at the aforesaid temperature and a stirring speed of 1000 to 2000 rpm (dissolver), 5.97 kg of AEROSIL® 200 was proportioned in at such a rate that the reaction mixture could still be readily stirred, for which a proportioning time of 3 to 4 hours was necessary. During the second half of the AEROSIL proportioning process, it was also necessary to add HDDA periodically, in order to ensure stirrability, a total of 3.3 kg of HDDA being consumed for this purpose. By means of the dissolver, stirring was continued for another 2 hours at 75° C. and 2000 to 3000 rpm, after which the lacquer, which still flowed freely, was transferred into a suitable vessel and allowed to cool to room temperature, gradually solidifying to a pasty mass.

Preparation of the ready-to-use lacquer from the paste prepared according to Example 4:

Example 4.1

0.498 kg of HDDA was heated to about 40° C. in a stirred vessel. Then, while intensive stirring was continued, 1 kg of paste was introduced at the same temperature within 30 minutes. After one further hour of stirring, the batch was cooled to room temperature.

Example 4.2

0.372 kg of HDDA was heated to about 40° C. in a stirred vessel. Then, while intensive stirring was continued, 1 kg of paste was introduced at the same temperature within 30 minutes. After one further hour of stirring, the batch was cooled to room temperature.

Example 4.3

0.279 kg of HDDA was heated to about 40° C. in a stirred vessel. Then, while intensive stirring was continued, 1 kg of paste was introduced at the same temperature within 30 minutes. After one further hour of stirring, the batch was cooled to room temperature.

Working Examples

The ready-to-use lacquers from Examples 1, 2, 3.1 to 3.3 and 4.1 to 4.3 and from the comparison example were applied with a doctor blade having a slit width of 25 μm onto decorative paper for determination of the abrasion and with a doctor blade having a slit width of 50 μm onto square PVC plates (edge length 10 cm, thickness 2 mm) for determination of the scratch hardness, then were cured in the low-energy electron accelerator (140 keV) with a dose of 50 kGy. The residual oxygen content in the accelerator was <200 ppm.

The samples were tested for their scratch hardness in accordance with DIN 53799 (incorporated hereing by reference), using a diamond tip and a carbide ball. The samples were also tested for abrasion resistance in accordance with DIN 68861 (incorporated herein by reference), using S-42 emery paper and two CS-0 abrasive disks at 50 and 1000 rpm. Furthermore, the samples were tested for haze in accordance with DIN 52347 (incorporated herein by reference) and ASTM D-1044 (incorporated herein by reference). The respective test results are presented in Tables 1 and 2.

TABLE 1

Summary of the test results

| Sample | Scratch hardness per DIN 53799 (N) | | Special Taber Abraser test per DIN 68861 (mg) | |
|---|---|---|---|---|
| | Diamond | Carbide ball[1] | 50 rpm | 1000 rpm |
| Example 1 CN936 OX 50, DYNASYLAN® VTMO, SR 444 | 3.0 | >10[2] | 13.1 | — |
| Example 2 EB 1290, Plakor® 13/OX 50, DYNASYLAN® VTMO, DPGDA | 3.0 | >10[2] | 0.6 | 6.7 |
| Comparison example EB 1290/DPGDA, Plakor®13/OX 50, DYNASYLAN® VTMO | 3.0 | >10[2] | 0.75 | 6.1 |

Notes:
[1]Diameter 1 mm
[2]Outside the measurement range of 10 N

TABLE 2

| SAMPLE | Scratch hardness per DIN 53799 (N) | | Haze per DIN 52347 and ASTM D 1044[2] (%) | |
|---|---|---|---|---|
| | Diamond | Carbide ball[1] | 100 rpm | 500 rpm |
| Example 3.1 Ebecryl® 5129, Aerosil® 200, DYNASYLAN® 6490, 37.4 wt % HDDA | 3.0 | >10[3] | 2.78 | 17.2 |
| Example 3.2 Ebecryl® 5129, Aerosil® 200, DYNASYLAN® 6490, 27.9 wt % HDDA | 3.5 | >10[3] | 2.31 | 13.91 |
| Example 3.3 Ebecryl® 5129, Aerosil® 200, 20.9 wt % HDDA | 3.5 | >10[3] | 1.92 | 9.68 |
| Example 4.1 Ebecryl® 1290, Aerosil® 200, DYNASYLAN® 6490, 49.8 wt % HDDA | 2.5 | >10[3] | 3.38 | 23.27 |
| Example 4.2 Ebecryl® 1290, Aerosil® 200, DYNASYLAN® 6490, 37.2 wt % HDDA | 2.5 | >10[2] | 2.51 | 14.38 |
| Example 4.3 Ebecryl® 1290, Aerosil® 200, DYNASYLAN® 6490, 27.9 wt % HDDA | 2.5 | >10[2] | 2.08 | 10.32 |

[1]Diameter 1 mm.
[2]Determination of abrasion resistance by light scattering (haze) after 100 and 500 Taber revolutions, two CS-10 abrasive disks, F = 5.5 ± 0.2 N, 3 individual measurements, arithmetic average.
[3]Outside the measurement range of 10 N.

Obviously, numerous modifications and variations of the present invention are possible in light of the above teachings. It is therefore to be understood that within the scope of the appended claims, the invention may be practiced otherwise than as specifically described herein.

This application is based on German patent applications 10116207.3, 10141688.1, and 10207401.1, filed Mar. 30, 2001, Aug. 25, 2001, and Feb. 21, 2002, respectively, the entire contents of each of which are hereby incorporated by reference, the same as if set forth at length.

What is claimed is:

1. A filled composition, comprising:
   at least one silico-organic nanohybrid or microhybrid capsule; and
   at least one synthetic resin or synthetic-resin precursor compound;
   wherein the silico-organic nanohybrid or microhybrid capsule comprises an oxide core A and a silico-organic shell B;
   wherein the oxide core A comprises at least one nanoscale or microscale particle (KA-O) of component (a), (b), or a mixture thereof,
   wherein the (KA-O) component (a) comprises at least one nanoscale oxide or mixed oxide of at least one metal or semimetal selected from the group consisting of main groups 2 to 6 of the Periodic Table, transition groups 1 to 8 of the Periodic Table, lanthanides, and mixtures thereof;
   wherein the (KA-O) component (b) comprises at least one microscale corundum;
   wherein the silico-organic shell B comprises:
   at least one silico-organic compound having the formula Ia:

$$(Si'O—)_x Si—R \qquad (Ia)$$

wherein R denotes an organofunctional group selected from the group consisting of straight-chain, branched or cyclic alkyl group with 1 to 50 C atoms, alkenyl group with 2 to 6 C atoms, chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl and ureidoalkyl;
   wherein x is a number from 0 to 20, wherein remaining free valences of Si are each independently (KA-O)—, SiO— or -Z,
wherein remaining free valences of Si' are each independently (KA-O)—, SiO—, —R, or -Z,
wherein the Z groups are the same or different and denote hydroxy or alkoxy group, and wherein each Si or Si' in the shell B have not more than one —R attached thereto;
which is obtained by reaction of:
(i) one or more oxide particles selected from the group consisting of:
(a) at least one nanoscale oxide and/or mixed oxide of at least one metal or semimetal of the second to sixth main group or of the first to eighth transition group of the periodic table or of the lanthanides or
(b) a microscale corundum; and
(c) a mixture of oxide particles of (a) and (b); with
(ii) at least one organofunctional silane having the formula II:

$R^1_s R^2_r SiY_{(4-s-r)}$ (II)

wherein the groups $R^1$ and $R^2$ are the same or different and each represents a straight-chain, branched or cyclic alkyl group with 1 to 50 C atoms, an alkenyl group with 2 to 6 C atoms, a chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, Y represents a methoxy, ethoxy, i-propoxy, n-propoxy or 2-methoxyethoxy group,
wherein s is equal to 1 or 2 or 3,
wherein r is equal to 0 or 1 or 2, with the proviso that $(s+r) \leq 3$,
(iii) optionally a monomeric and/or oligomeric silicic acid ester, which is substituted with one or more methoxy, ethoxy, n-propoxy or i-propoxy groups and which has an average degree of oligomerization of 1 to 50; and
(iv) optionally an organofunctional siloxane having one or more functionalities which are the same or different and each Si atom in the siloxane is substituted with one or more functionality selected from the group consisting of alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloxyalkyl, methacryloxyalkyl, mercaptoalkyl, ureidoalkyl, aryl and alkoxy, and remaining free valences of each Si atom in the siloxane are independently saturated by one or more methoxy or ethoxy or hydroxy groups;
wherein the reaction is performed in situ in a liquid, curable synthetic resin or a precursor stage of a synthetic resin in which the content of oxide particles of component (i) is 10 to 300 parts by weight relative to 100 parts by weight of the synthetic resin component used, and the reaction is performed in a kneading or dispersing machine, which is in the form of a filled paste.

2. The composition according to claim 1, wherein the silico-organic nanohybrid or microhybrid capsule has the formula 1b:

(KA-O)—((Si'O—)$_x$Si—R) (Ib), wherein R denotes an organofunctional group selected from the group consisting of straight-chain, branched or cyclic alkyl group with 1 to 50 C atoms, alkenyl group with 2 to 6 C atoms, chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl and ureidoalkyl,
wherein x is a number from 0 to 20,
wherein remaining free valences of Si are each independently (KA-O)—, SiO— and/or -Z,
wherein remaining free valences of Si' are each independently (KA-O)—, SiO—, —R and/or -Z,
wherein the Z groups are the same or different and denote hydroxy or alkoxy substituents,
and wherein each Si or Si' of shell B carries at most one group R.

3. The composition according to claim 1, wherein at least one of the free valencies of Si or Si' or both in said shell B is (KA-O).

4. A lacquer or scratch-resistant coating, comprising the composition as claimed in claim 1.

5. A method for making a lacquer or scratch-resistant coating, comprising contacting the composition of claim 1 with a solvent.

6. A method for making a lacquer or scratch-resistant coating, comprising diluting the composition of claim 1 with at least one selected from the group consisting of a liquid synthetic resin, a precursor compound of a synthetic resin, a solvent, and mixtures thereof.

7. A method for making a coating, comprising contacting the composition of claim 1 with a substrate.

8. A method for preparing a composition, comprising:
reacting:
(i) oxide particles from the series selected from the group consisting of:
(a) at least one nanoscale oxide and/or mixed oxide particle of at least one metal or semimetal of the second to sixth main group or of the first to eighth transition group of the periodic table or of the lanthanides or
(b) a microscale corundum particle or
(c) a mixture of oxide particles of (a) and (b), with
(ii) at least one organofunctional silane having the formula II

$R^1_s R^2_r SiY_{(4-s-r)}$ (II), wherein the groups $R^1$ and $R^2$ are the same or different and each independently represents a straight-chain, branched or cyclic alkyl group with 1 to 50 C atoms, an alkenyl group with 2 to 6 C atoms, a chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl and ureidoalkyl group,
wherein Y represents a methoxy, ethoxy, i-propoxy, n-propoxy or 2-methoxyethoxy group,
wherein s is equal to 1 or 2 or 3 and r is equal to 0 or 1 or 2, with the proviso that $(s+r) \leq 3$, and
(iii) optionally a monomeric and/or oligomeric silicic acid ester, which is substituted with one or more methoxy, ethoxy, n-propoxy or i-propoxy groups and which has an average degree of oligomerization of 1 to 50; and
(iv) optionally an organofunctional siloxane having one or more functionalities which are the same or different and each Si atom in the siloxane is substituted with one or more functionality selected from the group consisting of alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloxyalkyl, methacryloxyalkyl, mercaptoalkyl, ureidoalkyl, aryl and alkoxy, and remaining free valences of each Si atom in the siloxane are independently saturated by one or more methoxy or ethoxy or hydroxy groups;

wherein the reaction is performed in situ in a liquid, curable synthetic resin or a precursor stage of a synthetic resin in which the content of oxide particles of component (i) is 10 to 300 parts by weight relative to 100 parts by weight of the synthetic resin component used, and the reaction is performed in a kneading or dispersing machine, wherein said composition comprises:

at least one silico-organic nanohybrid or microhybrid capsule; and at least one synthetic resin or synthetic-resin precursor compound;

wherein the silica-organic nanohvbrid or microhybrid capsule comprises an oxide core A and a silica-organic shell B;

wherein the oxide core A comprises at least one nanoscale or microscale particle (KA-O) of component (a), (b), or a mixture thereof, wherein the (KA-O) component (a) comprises at least one nanoscale oxide or mixed oxide of at least one metal or semimetal selected from the group consisting of main groups 2 to 6 of the Periodic Table, transition groups 1 to 8 of the Periodic Table, lanthanides, and mixtures thereof;

wherein the (KA-O) component (b) comprises at least one microscale corundum;

wherein the silico-organic shell B comprises:

at least one silico-organic compound having the formula Ia:

(Si'O—)$_x$Si—R        (Ia)

wherein R denotes an organofunctional group selected from the group consisting of straight-chain, branched or cyclic alkyl group with 1 to 50 C atoms, alkenyl group with 2 to 6 C atoms, chloroalkyl, isocyanoalkyl, cyanoalkyl, fluoroalkyl, aryl, acylalkyl, acryloxyalkyl, methacryloxyalkyl, polysulfanealkyl, mercaptoalkyl, thiacyamidoalkyl, glycidyloxyalkyl, aminoalkyl, diaminoalkyl, triaminoalkyl, carbonatoalkyl and ureidoalkyl;

wherein x is a number from 0 to 20, wherein remaining free valences of Si are each independently (KA-O)—, SiO— or -Z, wherein remaining free valences of Si' are each independently (KA-O)—, SiO—, —R, or -Z, wherein the Z groups are the same or different and denote hydroxy or alkoxy group, and wherein each Si or Si' in the shell B have not more than one —R attached thereto.

9. The method according to claim 8, wherein the curable synthetic resin or precursor stage of a curable synthetic resin is selected from the group consisting of an acrylate, methacrylate, epoxide, epoxy resin, polyurethane, polyurethane resin, unsaturated polyester, unsaturated polyester resin, epoxy acrylate, polyester acrylate, urethane acrylate, silicone acrylate, and mixtures thereof.

10. The method according to claim 8, wherein >80 to 200 parts by weight of oxide component (i) relative to 100 parts by weight of the synthetic resin are used.

11. The method according to claim 8, wherein at least one oxide component (i) and at least one silane-based component selected from the group consisting of (ii), (iii), (iv), and mixtures thereof are used in a weight ratio of 100:1 to 0.5:1.

12. The method according to claim 8, wherein component (a) comprises nanoscale oxide and/or mixed oxide particles selected from the group consisting of Si, Al, Ti, Zr, and mixtures thereof, and the particles have an average particle size of 1 to 200 nm.

13. The method according to claim 8, wherein nanoscale silica is used as component (a).

14. The method according to claim 8, wherein component (b) comprises microscale corundum particles with an average particle size of 3 to 40 μm.

15. The method according to claim 8, wherein component (c) comprises an oxide particle mixture comprising a nanoscale silica (a) and a microscale corundum (b).

16. The method according to claim 8, wherein component (ii) is selected from the group consisting of 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-methacryloxy-2-methylpropyl-trimethoxysilane, 3-methacryloxy-2-methylpropyltriethoxysilane, vinyltrimethoxysilane, vinyltriethoxysilane, vinyl methyldimethoxysilane, vinyl methyldiethoxysilane, phenyltrimethoxysilane, phenyltriethoxysilane, n-propyltrimethoxysilane, n-propyltriethoxysilane, and a mixture thereof.

17. The method according to claim 8, wherein component (iv) is selected from the group consisting of n-propylmethoxysiloxane, n-propylethoxysiloxane, vinyl methoxysiloxane, vinylethoxysiloxane, phenyltrimethoxysiloxane, phenyltriethoxysiloxane, perfluoro-1,1,2,2-tetrahydroalkylethoxysiloxane, perfluoro-1,1,2,2-tetrahydroalkylmethoxysiloxane, each having 3 to 16 C atoms in the alkyl groups, 3-methacryloxypropylmethoxysiloxane, 3-methacryloxypropylethoxysiloxane, n-propyl/vinylmethoxysiloxane, n-propyl/vinylethoxysiloxane, phenyl/vinylethoxysiloxane, phenyl/vinylmethoxysiloxane, 3-methacryloxypropyl/n-propylmethoxysiloxane,3-methacryloxypropyl/npropylethoxysiloxane, 3-methacryloxypropyl/phenylethoxysiloxane, 3-methacryloxypropyl/phenylethoxysiloxane, 3-methacryloxypropyl/tridecafluoro-1,1,2,2-tetrahydrooctylmethoxysiloxane, 3-methacryloxypropyl/tridecafluoro-1,1,2,2-tetrahydrooctylethoxysiloxane, vinyl/tridecafluoro-1,1,2,2-tetrahydrooctylmethoxysiloxane, vinyl/tridecafluoro-1,1,2,2-tetrahydrooctylethoxysiloxane and mixtures thereof.

18. The method according to claim 8, wherein the reaction is performed in the presence of a catalyst.

19. The method according to claim 8, wherein the reaction is performed in the presence of a surfactant.

20. The method according to claim 8, wherein the reaction is performed in the presence of water.

21. The method according to claim 8, wherein the reaction is performed in the presence of 0.5 to 6 mole of water per mole of Si of the silico-organic component (ii).

22. The method according to claim 8, wherein the reaction is performed at a temperature in the range of 30 to 100° C.

23. The method according to claim 8, further comprising diluting the composition with at least one selected from the group consisting of a liquid synthetic resin, a precursor compound of a synthetic resin, a solvent, and mixtures thereof, to prepare a lacquer or scratch-resistant coating.

24. The method according to claim 8, wherein:

the curable synthetic resin or a precursor stage of a curable synthetic resin is placed in a kneading or dispersing machine and heated, catalyst and optionally surfactant and optionally water is added, components (ii) to (iv) are introduced; and oxide particles (i) are added while thoroughly intermixing.

25. The method according to claim 24, wherein the curable synthetic resin or a precursor compound of a curable synthetic resin is heated to a temperature in the range of 50 to 90° C.

26. The method according to claim 24, wherein the curable synthetic resin or a precursor compound of a curable synthetic resin is heated to a temperature in the range of 65 to 75° C.

27. The method according to claim 24, wherein an alcohol is formed and is removed from the reaction system during the reaction and/or after the reaction.

* * * * *